(12) United States Patent
Rosgardt

(10) Patent No.: US 12,716,767 B2
(45) Date of Patent: Aug. 25, 2026

(54) ASSISTED VEHICLE LOAD CALIBRATION

(71) Applicant: VOLVO TRUCK CORPORATION, Gothenburg (SE)

(72) Inventor: Tommy Rosgardt, Lindome (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 340 days.

(21) Appl. No.: 18/044,121

(22) PCT Filed: May 20, 2021

(86) PCT No.: PCT/EP2021/063506

§ 371 (c)(1), (2) Date: Mar. 6, 2023

(87) PCT Pub. No.: WO2022/053187

PCT Pub. Date: Mar. 17, 2022

(65) Prior Publication Data

US 2023/0314206 A1 Oct. 5, 2023

(30) Foreign Application Priority Data

Sep. 8, 2020 (EP) .................................... 20194985

(51) Int. Cl.
*G01G 19/08* (2006.01)

(52) U.S. Cl.
CPC .................................. *G01G 19/086* (2013.01)

(58) Field of Classification Search
CPC ...... G01G 19/02; G01G 19/08; G01G 19/086; G01G 23/01
See application file for complete search history.

(56) References Cited

U.S. PATENT DOCUMENTS 9,695,571 B1 * 7/2017 Ge .......................... E02F 3/435
2013/0124007 A1 5/2013 Karl et al.
2015/0161830 A1 6/2015 Lenhardt et al.
2016/0223387 A1 8/2016 Talmaki et al.
2016/0238436 A1 * 8/2016 Shatters ................ G01G 23/01
(Continued)

FOREIGN PATENT DOCUMENTS

WO 2017189361 A1 11/2017

OTHER PUBLICATIONS

International Search Report and Written Opinion in corresponding International Application No. PCT/EP2021/063506 mailed Sep. 3, 2021 (12 pages).

*Primary Examiner* — Natalie Huls
(74) *Attorney, Agent, or Firm* — Jeffri A. Kaminski; Venable LLP

(57) ABSTRACT

A method in a first vehicle for determining a load of the first vehicle includes obtaining, from one or more sensors arranged in or at the first vehicle, an internal value of the load and an associated accuracy of the load; obtaining, from an external source, an external value and an associated accuracy of the load; and determining, based on a comparison of the respective accuracies, the load to be the internal value, the external value or a combination thereof. A method in a second vehicle for facilitating a determination of a load of a first vehicle comprises: obtaining, from one or more sensors arranged in or at the second vehicle, an internal value of the load of the first vehicle and an associated accuracy; and sharing the internal value and the associated accuracy with the first vehicle.

12 Claims, 3 Drawing Sheets

(56) References Cited

U.S. PATENT DOCUMENTS

| | | | |
|---|---|---|---|
| 2018/0141567 | A1 | 5/2018 | Surnilla et al. |
| 2018/0320645 | A1 | 11/2018 | McQuillen et al. |
| 2019/0383950 | A1 | 12/2019 | Bagheri |

* cited by examiner 10
11
12
89
80
81
82

10
29
20
12
21
22
11
23
19

90
10
12
11

ASSISTED VEHICLE LOAD CALIBRATION

CROSS-REFERENCE TO RELATED APPLICATIONS

This application is a U.S. National Stage application of PCT/EP2021/063506, filed May 20, 2021 and published on Mar. 17, 2022 as WO 2022/053187, which claims the benefit of European Patent Application No. 20194985.6, filed Sep. 8, 2020, all of which are hereby incorporated by reference in their entireties.

TECHNICAL FIELD

The present disclosure relates to the field of vehicular control and in particular to methods and devices for determining a load of a vehicle.

BACKGROUND

Accurate estimates of a vehicle's current weight or load or per-axle load are key to safe and economic driving, notably braking, as well as assisted or autonomous driving. Real-time load estimates may further be necessary for compliance with road regulations, commercial/fiscal reporting, bulk material (un)loading, transfer of goods between vehicles, and similar applications.

There exist load measurement techniques relying on onboard strain or pressure sensors indicating the load on an axle, in a bucket, crane etc., which are capable of a considerable accuracy provided sufficiently sophisticated sensor hardware is used. The economic efficiency of expenditure on onboard sensors is questionable, however, as an onboard sensor is used relatively seldom and only for the benefit of the vehicle where it is installed. Also known in the art are stationary weighing installations, such as roadside truck scales and weighbridges. These are obviously useful primarily in their geographic vicinity, and may furthermore require involvement of the driver, e.g., manual reading and input of the measured weight value.

US20160223387A1 discloses construction equipment vehicles, each equipped with a load sensor, which exchange payloads between themselves by loading and unloading. If a discrepancy between different vehicles' load measurements is discovered, a calibration process among the load sensors may be triggered. To ensure that a relatively more accurate sensor is used to calibrate a relatively less accurate sensor rather than the opposite, properties such as type, age and damage history may be tracked.

It would be desirable to measure or estimate the load of a vehicle by a method and/or using equipment that is both cost-effective, easily available, and accurate.

SUMMARY

One objective is to make available an accuracy-oriented method for determining a load of a vehicle with the support of an external source. Another objective is to make available a vehicle equipped and configured to perform such method. A particular objective is to propose a supporting vehicle for facilitating a determination of a load of a first vehicle.

These and other objectives are achieved by the invention as defined by the appended independent claims.

In one aspect, there is provided a method implemented in a first vehicle for determining a load of the first vehicle. The load thus determined may be used in controlling the first vehicle. In one embodiment, the method comprises obtaining an internal value of the load and an associated accuracy of the load from one or more sensors arranged in or at the first vehicle; obtaining an external value and an associated accuracy of the load from an external source; and determining the load to be the internal value, the external value or a combination thereof based on an evaluation (e.g., comparison) of the respective accuracies.

By the method according to this aspect, in which the vehicle's sensor cooperates with an external source, the vehicle load can be determined with high accuracy. This is made possible by the availability of two values, which may allow mutual cancellation of systematic or stochastic errors, or both. This effect also arises when the vehicle's sensor is rather simple. Conversely, an investment in the measuring facilities of the external source pays off, as the external source may be brought to support internal sensors of a large number of vehicles.

As used herein, a "load" may be any of a total vehicle weight, a vehicle load, an axle load, a payload, a bucket load, a crane load, a vehicle bed load. An "axle load" may be total load on transverse pair of wheels, whether the wheels are fitted to a common axle, to a split axle or are suspended individually. Accordingly, an axle load sensor may comprise multiple sub-sensors.

An "accuracy" in the sense of the claims includes a confidence interval, a tolerance, a measurement quality indicator provided by the sensor, an index to a level of a predefined accuracy grading or any suitable measure for quantifying statistic dispersion, such as a variance, a range of variation, a confidence interval length, a deviation, a variation coefficient, an entropy etc. or an inverse of such statistical measure.

A "combination" of the internal and external value may be an average or a weighted average, wherein weights may be (inversely) related to the respective accuracies of the values. A value captured by the vehicle's sensor which has then been calibrated using the external value is another "combination" in the sense of the claims. This applies in particular to post-calibrated values from the vehicle's sensor, i.e., values to which has been applied a correction term or correction factor computed on the basis of the external value. Also covered by the term "combination" is the output of a machine-learning algorithm (artificial intelligence, AI) having been trained to correct the internal value reading on the basis of past comparisons with external values.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

In another aspect, there is provided a method implemented in a second vehicle for facilitating a determination of a load of a first vehicle. In one embodiment, the method comprises obtaining an internal value of the load of the first vehicle and an accuracy associated with the internal value, wherein the internal value is obtained using one or more sensors arranged in the second vehicle. Accordingly, the qualifier "internal" refers to the second vehicle here. The method further comprises sharing the internal value and the associated accuracy with the first vehicle.

By performing this method, the second vehicle supports the execution of the method in the first vehicle. The measuring abilities of the second vehicle's sensor(s) are put at the disposal of the first vehicle. Even if the measuring abilities are comparable with the first vehicle's sensors, the internal value provided by the second vehicle will constitute another datapoint, which may help eliminate systematic or stochastic errors, or both.

In further aspects, there are provided vehicles configured to assume the role of "first vehicle" (whose load shall be determined) or "second vehicle" (which supports the determination) in performing the methods presented above.

The invention further relates to a computer program containing instructions for causing a computer, or processing circuitry in the first/second vehicle in particular, to carry out one of the above methods. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storages of magnetic, optical or solid-state type. Still within the scope of "data carrier", such memories may be fixedly mounted or portable.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figures 1, 2, 3:
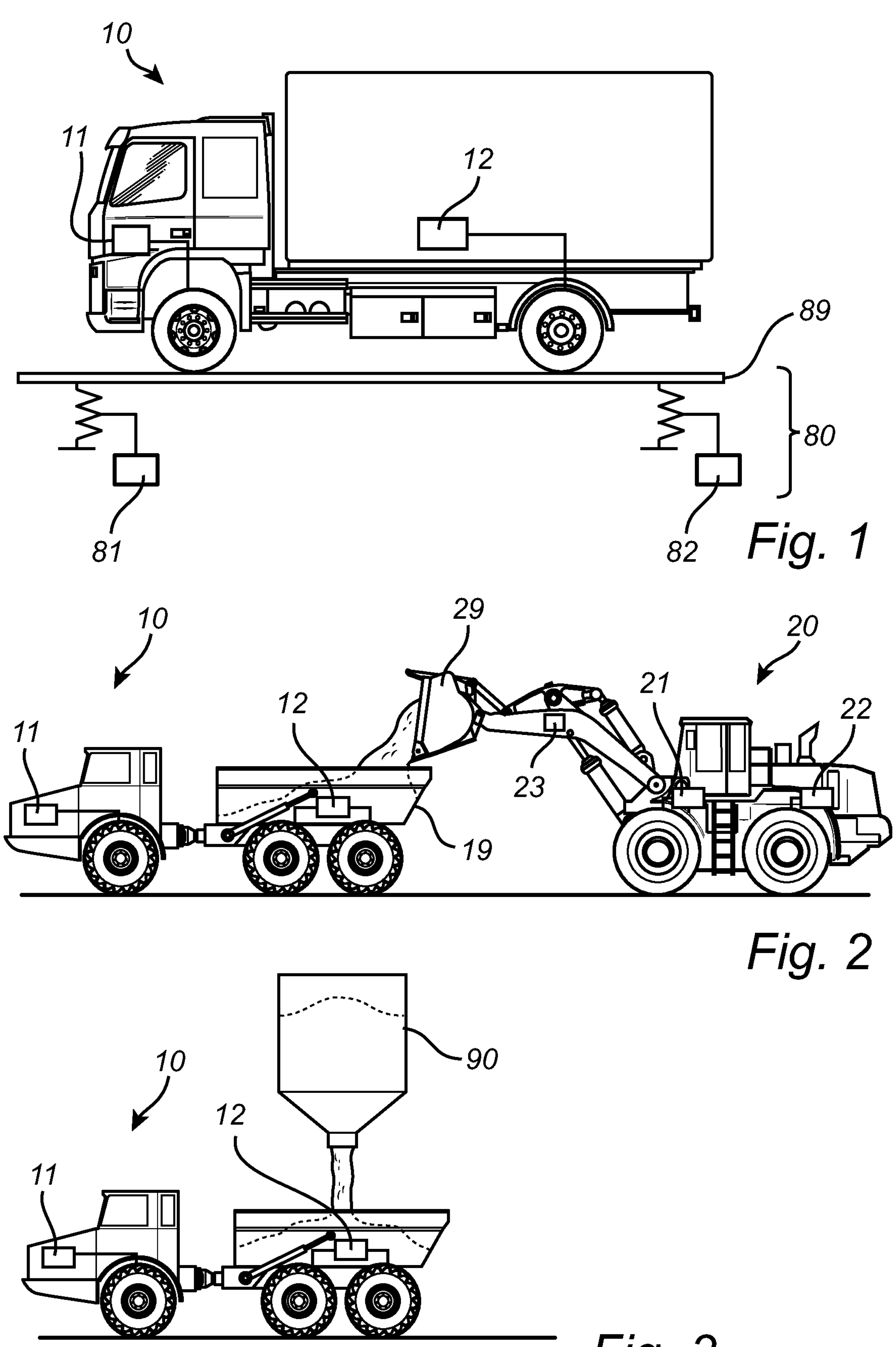
FIG. 1 shows a truck on a weighbridge, wherein the truck is equipped with load sensors and configured in accordance with an embodiment of the invention.
FIG. 2 shows a construction truck which is in the process of receiving goods from the bucket of a loader, the two vehicles being equipped with load sensors, connected by a communication link and each configured in accordance with an embodiment of the invention.
FIG. 3 shows a construction truck which is receiving a bulk material from a stationary facility, the construction truck being equipped with load sensors, connected to the stationary facility by a communication link and configured in accordance with an embodiment of the invention.

In FIG. 1, a two-axle truck 10 for road traffic is shown positioned on a weighbridge (or truck scale) 80. The truck 10, which may be an autonomous or conventional vehicle, is equipped with a front axle load sensor 11 adapted to sense the current load (axle load, axle weight) on the truck's 10 front wheel pair, as well as a rear axle load sensor 12 adapted to sense the rear axle load. The gross vehicle weight (sum of axle loads) of the truck 10 may be computed as the sum of the readings of the front ii and rear 12 axle load sensors. The gross vehicle weight, when computed on this basis, is associated with an accuracy. The accuracy may be a constant characteristic of the axle load sensors 11, 12, which provide the raw data, or may vary as a function of the conditions in which the readings were made (e.g., vibrations, signal noise, inclination of the truck 10) and/or of the axle load sensors 11, 12 themselves (e.g., hardware aging, time since latest calibration).

The weighbridge 80 generally consists of a plate 89, which is supported by one or more weight sensors 81, 82. The gross vehicle weight of the truck 10 standing on the weighbridge 80 may be computed as the sum of the readings of the weight sensors 81, 82. Further, assuming the plate 89 is approximately level with the surrounding ground, the weight sensors 81, 82 can be brought to indicate an approximate axle load of the truck 10 if the truck 10 is positioned in such manner that only one pair of wheels rests on the plate 89 and the other pair rests on the ground. The accuracy of the weight sensors 81, 82, which may comprise load cells, may be taken to be constant (e.g., a nominal value indicated by the supplier of the weigh-bridge 80) or may be known to vary with weighing conditions, aging and so forth.

To implement an embodiment of the present invention, the truck 10 may be communicatively connectable to the weighbridge 80 over a wired or wireless communication interface (not shown) and may comprise processing circuitry (not shown). A wireless communication interface may be a radio interface, such as cellular network interface, a local-area wireless network interface, a short-range wireless interface or a near-field communication interface. The communication between the truck 10 and the weighbridge 80 need not proceed over a direct physical link, but instead each vehicle may be connected through some suitable means to the Internet, wherein routing of messages is handled by the Internet Protocol. Via the communication interface, the truck 10 obtains from the weighbridge 80 an external value $V_{20}$ of the gross vehicle weight and an associated accuracy ACC (V20) of the external value. The external value $V_{20}$ and the associated accuracy ACC(V20) may be communicated in the form of indices into a predefined lookup table or database; this may reduce the quantity of data that needs to be transmitted.

The truck 10 may obtain the external value $V_{20}$ by sending a request to a communication interface of the weighbridge 80, to which the weighbridge 80 is expected to respond by sending a data message with the external value $V_{20}$. Alternatively, the weighbridge 80 transfers the data message of its own motion. In particular, the transmission of the data message may be triggered by fulfilment of a pre-agreed rule evaluated by the weighbridge 80 (e.g., truck 10 reaching the weighing position, truck 10 flashing its headlights), an interoperability rule evaluated by the weighbridge 80 (e.g., periodic transmission of messages or another rule codified in an industry standard specification) or by an event which the weighbridge 80 is able to identify.

An internal value $V_{10}$ of the gross vehicle weight and an associated accuracy ACC(V10) are available as well. As suggested above, a nominal value may be used as the accuracy ACC(V10) of the internal value $V_{10}$; alternatively this accuracy may be computed on the basis of conditions of the reading, the age of the sensor, time elapsed since the latest calibration and/or other relevant factors.

The processing circuitry of the truck 10 compares the two accuracy values ACC(V10), ACC(V20) and decides whether the gross vehicle weight shall be determined to be equal to the internal value $V_{10}$, an external value $V_{20}$ or a combination thereof. The internal value $V_{10}$ may be chosen if its accuracy ACC(V10) is superior to ACC(V20), and otherwise the external value $V_{20}$ is preferred. A combination of the internal and external values may be a uniform average $$\frac{1}{2}(V_{10}+V_{20})$$

or, more generally, a weighted average $$\frac{1}{\alpha_{10}+\alpha_{20}}(\alpha_{10}V_{10}+\alpha_{20}V_{20}),$$

where the weighting coefficients may be set to reflect any difference between the accuracy values ACC(V10), ACC (V20). As a further alternative, the external value $V_{20}$ may be used to calibrate the axle load sensors 11, 12 prior to the reading of the internal value $V_{10}$, whereby normally the internal value $V_{10}$ will tend to be closer to the external value $V_{20}$.

A condition where the internal value $V_{10}$ or the external value $V_{20}$ is outside its expected range, especially if this is not expected in view of a poor value of the associated accuracy, may indicate that the sensors in the truck 10 or the weighbridge 80 are out of order. Appropriate maintenance action may be triggered.

Assuming the weighing procedure terminates orderly, the determined gross vehicle weight may be used to control various quantities in the vehicle, such as suspension settings, damping of chassis movements, braking response, cruise control, powertrain parameters, skid avoidance etc. Accurate knowledge of the gross vehicle weight is also very valuable in the control of an autonomous or semi-autonomous vehicle.

It is notable that, in the just described embodiment, the load (gross vehicle weight) is measured by different sensors of two different types. The sensor types measure the loads in two qualitatively different ways. In particular, if the axle load sensors 11, 12 in the truck 10 are strain sensors, they clearly rely on a different measuring principle than, say, hydraulic weight sensors 81, 82 installed in the weighbridge 80.

FIG. 2 shows two independently operating vehicles which perform embodiments of the present invention. More precisely, the “first vehicle” in the sense of the appended claims is a construction truck 10 and the “second vehicle” is a loader 20. The truck 10 is shown receiving goods from the bucket 29 of the loader 20.

As suggested by the graphics in FIG. 2, the truck 10 is equipped with a front load sensor 11 sensing a load on the front axle and a rear load sensor 12 sensing the combined load on the rear axles supporting the bed 19 and thereby the payload of the truck 10. Variations in the payload may be more noticeable on the rear axles than on the front axle, especially if the chassis of the truck 10 is articulated to allow relative pitch. The loader 20 for its part has a front axle load sensor 21, a rear axle load sensor 22 and a bucket load sensor 23. The bucket load sensor 23 is configured to sense the mass of the material currently present in the bucket 29; this may for example be achieved by measuring strain of a mechanical element or a hydraulic pressure. The accuracy ACC(V20) may be constant, or it may vary with factors such as an angular position of the bucket 29. Further, the bucket load sensor 23 may also be treated as less reliable the more time has passed since a most recent calibration. In an idealized model, the loader's 20 release of the goods will cause the bucket load to decrease by an amount equal to the increase in bed load experienced by the truck 10.

Between the two vehicles 10, 20, there is established a communication link of one of the types discussed above, so that the loader (second vehicle) 20 may assist the truck (first vehicle) 10 in determining a bedload (load) of the truck 10. The endpoints of the communication link may be a respective communication interface in each vehicle 10, 20.

Figure 4:
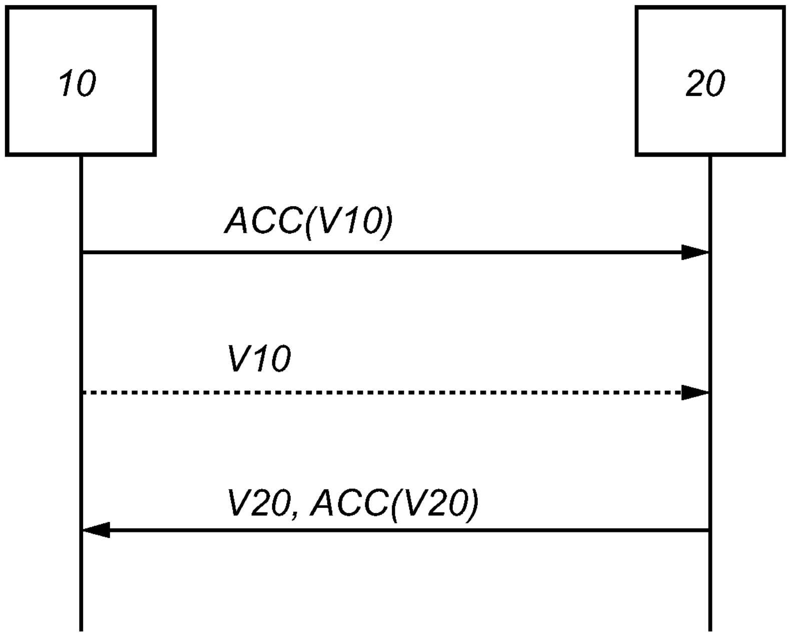
FIG. 4 is a sequence diagram showing an exchange of data messages between two vehicles, in accordance with an embodiment of the invention.

The sequence diagram in FIG. 4 depicts a possible exchange of data messages between the vehicles 10, 20. A first message from the truck 10 to the loader 20 carries the accuracy ACC(V10) associated with the truck's internal value $V_{10}$ of the bed load. As shown by the use of dashed line, it is optional to transfer the internal value $V_{10}$ of the bed load itself. When the loader 20 receives the accuracy ACC (V10) associated with the truck's internal value $V_{10}$ of the bed load, it performs a comparison with the accuracy ACC(V20) associated with its reading $V_{20}$ of the bucket load sensor 23. (The reading $V_{20}$ of the bucket load sensor 23 may in fact be a difference of two consecutive readings, before and after the unloading of the goods in the bucket 23.)

If the loader's 20 own accuracy ACC(V20) is found to be superior to the truck's 10 accuracy ACC(V10), then the loader 20 shares the reading $V_{20}$ of the bucket load sensor 23 with the truck 10. The reading $V_{20}$ is optionally accompanied by the associated accuracy ACC(V20), which may be included in a common data message, shown as the third data message in FIG. 4.

The loader 20 may share the reading $V_{20}$ by initiating transmission of a data message to the truck 10. Alternatively, the loader 20 makes the reading $V_{20}$ available for retrieval by the truck 10, e.g., by placing it in a shared memory space or enabling a transmission of the reading $V_{20}$ once this is requested. Further alternatively, the loader 20 stores the reading $V_{20}$ temporarily and transmits it later in an event-triggered or pre-scheduled (e.g., periodic) data message. After the truck's 10 accuracy ACC(V10) has been received and processed by the loader 20, the unloading of the bucket 29 may be configured as an event triggering dispatch of the data message with the reading $V_{20}$.

If instead the loader 20 ascertains that the truck's 10 accuracy ACC(V10) is superior to its own accuracy ACC (V20), it may decide to withhold the reading $V_{20}$ of the bucket load sensor 23 from being shared with the truck 10. It may send a message (not shown) indicating this outcome to the truck 10; receipt of such message may enable the truck 10 to exclude the scenario that an internal failure in either vehicle or a communication error has aborted the exchange prematurely.

In the limit case where the loader 20 ascertains that the truck's 10 accuracy ACC(V10) is comparable to its own accuracy ACC(V20), the loader 20 may be configured to share the reading $V_{20}$. This affords the truck 10 the liberty to decide autonomously which reading to use.

The embodiment illustrated in FIGS. 2 and 4 may be simplified by configuring the second vehicle 20 to share the internal value $V_{20}$ of the load of the first vehicle 10 and the associated accuracy ACC(V20) unconditionally, i.e., without a preceding comparison with the accuracy ACC(V10) associated with the first vehicle's 10 value $V_{10}$ of the same load. In other words, the second vehicle 20 executes its part of the collaborative load estimation (or load calibration) without knowledge of the first vehicle's 10 value $V_{10}$ of the same load. This gives the first vehicle 10 full latitude to use the internal value $V_{10}$ or the external value $V_{20}$; for this decision, it may have recourse to the respective accuracy values ACC(V10), ACC(V20).

A further embodiment will now be discussed, where the "first vehicle" is the articulated construction truck 10 introduced above with reference to FIG. 2. FIG. 3 shows this truck 10 when receiving a payload from a stationary facility comprising a tank 90. The payload may be a quantity of bulk material released from a lower orifice of the tank 90, which is equipped with a level sensor or weight sensor for estimating the mass or volume of the current content of the tank 90. The weight of the released bulk material may then be determined as the difference of two consecutive readings. Idealized, the release of the bulk material through the orifice will cause the mass of the tank 90 to decrease by an amount equal to the increase in bed load experienced by the truck 10. The truck 10 may determine the increase in bed load by two consecutive readings. Alternatively, the tank 90 may be equipped with a flow sensor (e.g., positive displacement meter, magnetic flow meter) configured to sense the quantity of material passing through the orifice per unit time or an accumulated quantity which has passed through the orifice.

The accuracy of the tank's 90 level sensor, weight sensor or flow sensor may be uniform, or it may be dependent on factors such as the current fill level of the tank 90, the speed at which the bulk material is being released through the orifice, electric or magnetic properties of the bulk material etc. As such, and also because a large number of different vehicles may be calling at the loading station of the tank 90, it may be configured to communicate its accuracy value at each loading episode.

The exchange of messages between communication interfaces in the truck 10 and tank 90, as well as their processing of load data and accuracy values, may proceed in a similar manner as described above with reference to FIG. 2. A main difference is that the truck's 10 load determination is assisted by stationary sensors rather than mobile sensors.

Figure 5:
FIG. 5 shows example vehicles.
Figure 5:
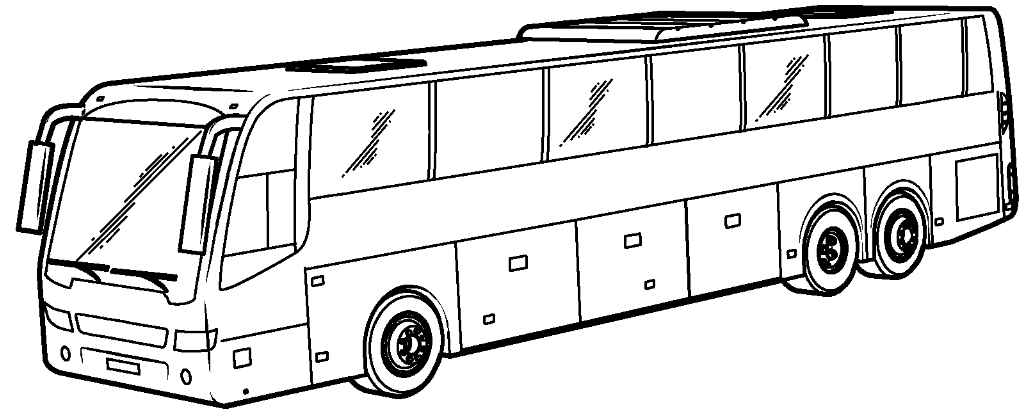
Figure 5:
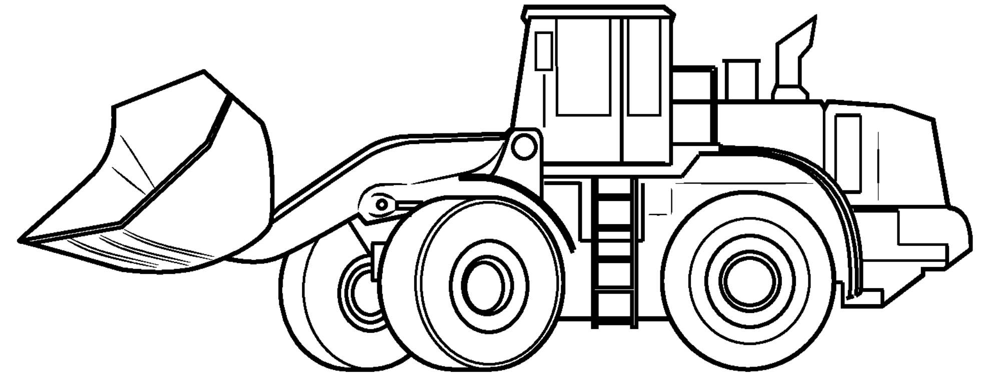

FIG. 5 shows a road truck, a bus and a construction vehicle, each of which is suitable to act as "first vehicle" and/or "second vehicle" in the sense of the appended claims.

The aspects of the invention have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A computer-implemented method in a first vehicle for determining a load of the first vehicle for use in controlling the first vehicle, the method comprising:

obtaining, from one or more sensors arranged in or at the first vehicle, an internal value of the load and an associated accuracy of the load;

obtaining, from an external source, an external value and an associated accuracy of the load; and determining, based on a comparison of the respective accuracies, the load to be the internal value, the external value or a combination thereof, wherein each accuracy includes a confidence interval, a tolerance, a measurement quality indicator provided by the sensor, or a measure for quantifying statistic dispersion; and controlling at least one of suspension settings, damping of chassis movements, braking response, cruise control, powertrain parameters, or skid avoidance of the first vehicle based on the determined load.

2. The method of claim 1, wherein at least one of the following holds:

a) the first vehicle requests the external value from the external source;

b) the first vehicle receives the external value in a transmission initiated by the external source.

3. The method of claim 1, wherein at least one of the following holds:

a) the external value is captured by at least one stationary sensor;

b) the external value is captured by at least one mobile sensor.

4. The method of claim 1, wherein:

the load corresponds to a payload which is received from a second vehicle or from a stationary facility; and a value of the load is collected by reading at least one axle load sensor in the first vehicle before and after receiving the payload.

5. The method of claim 1, wherein the external value is obtained, from the other vehicle or external source, using a wireless connection.

6. The method of claim 1, wherein the external value is obtained, from the other vehicle or external source, using a wired connection.

7. The method of claim 1, wherein the load is an axle load.

8. The method of claim 1, wherein the load is one or more of:

a bucket load, a crane load, a tank load, a bed load.

9. The method of claim 8, wherein:

the load corresponds to a payload which the first vehicle receives from the second vehicle.

10. The method of claim 1, wherein the external value is represented as an index to an item in a predefined lookup table or database.

11. The method of claim 2, wherein the first vehicle receives the external value in a transmission initiated by the external source, and the transmission is initiated based on a pre-agreed or specified rule and/or is triggered by an event identified in the external source.

12. A first vehicle configured to determine a load of the first vehicle for use in controlling the first vehicle, comprising:

one or more sensors providing an internal value of the load and an associated accuracy of the load;

a communication interface towards an external source for obtaining an external value and an associated accuracy of the load; and processing circuitry configured to compare the respective accuracies and to determine, based thereon, the load to be the internal value, the external value or a combination thereof, wherein each accuracy includes a confidence interval, a tolerance, a measurement quality indicator provided by the sensor, or a measure for quantifying statistic dispersion, and to control at least one of suspension settings, damping of chassis movements, braking response, cruise control, powertrain parameters, or skid avoidance of the first vehicle based on the determined load.

* * * * *